(12) United States Patent
Hosseini et al.

(10) Patent No.: US 10,705,407 B2
(45) Date of Patent: Jul. 7, 2020

(54) SPECKLE REDUCTION IN PHOTONIC PHASED ARRAYS

(71) Applicant: ANALOG PHOTONICS LLC, Boston, MA (US)

(72) Inventors: Ehsan Hosseini, Milton, MA (US); Michael Watts, Hingham, MA (US); Peter Russo, Somerville, MA (US)

(73) Assignee: Analog Photonics LLC, Boston, MA (US)

( * ) Notice: Subject to any disclaimer, the term of this patent is extended or adjusted under 35 U.S.C. 154(b) by 158 days.

(21) Appl. No.: 15/974,607

(22) Filed: May 8, 2018

(65) Prior Publication Data

US 2018/0348592 A1    Dec. 6, 2018

Related U.S. Application Data

(60) Provisional application No. 62/502,904, filed on May 8, 2017, provisional application No. 62/666,110, filed on May 3, 2018.

(51) Int. Cl.
| | |
|---|---|
| *G02F 1/29* | (2006.01) |
| *G02B 27/48* | (2006.01) |
| *G02B 27/00* | (2006.01) |
| *G01S 17/02* | (2020.01) |

(52) U.S. Cl.
CPC ............ *G02F 1/292* (2013.01); *G01S 17/02* (2013.01); *G02B 27/0087* (2013.01); *G02B 27/48* (2013.01)

(58) Field of Classification Search
CPC ...... G02F 1/292; G02B 27/0087; G02B 27/48; G01S 17/02
See application file for complete search history.

(56) References Cited

U.S. PATENT DOCUMENTS

| | | | |
|---|---|---|---|
| 4,950,880 | A | 8/1990 | Hayner |
| 7,397,568 | B2 | 7/2008 | Bryce et al. |
| 2004/0246604 | A1 | 12/2004 | Fiete et al. |
| 2014/0376001 | A1* | 12/2014 | Swanson ............ G01B 9/02091 356/479 |
| 2017/0184450 | A1* | 6/2017 | Doylend ............... G01J 1/4228 |
| 2017/0350965 | A1 | 12/2017 | Schmalenberg |
| 2018/0052378 | A1* | 2/2018 | Shin ........................ G02F 1/292 |
| 2018/0321569 | A1* | 11/2018 | Spector ................... G02F 1/218 |
| 2018/0348592 | A1 | 12/2018 | Hosseini et al. |
| 2019/0339389 | A1 | 11/2019 | Russo et al. |

OTHER PUBLICATIONS

Idell et al., "Image synthesis from nonimaged laser-speckle patterns", Optics Letters, vol. 12, No. 11, pp. 858-860, Nov. 1987.
Idell et al., "Image synthesis from nonimaged laser-speckle patterns: experimental verification", Optics Letters, vol. 14, No. 3, pp. 154-156, Feb. 1, 1989.

* cited by examiner

*Primary Examiner* — Que Tan Le
*Assistant Examiner* — Jennifer D Bennett
(74) *Attorney, Agent, or Firm* — Young Basile Hanlon & MacFarlane, P.C.

(57) ABSTRACT

Aspects of the present disclosure describe systems, methods, and structures providing speckle reduction in photonic phased array structures.

19 Claims, 23 Drawing Sheets

SPECKLE REDUCTION IN PHOTONIC PHASED ARRAYS

CROSS REFERENCE TO RELATED APPLICATIONS

This application claims the benefit of U.S. Provisional Patent Application Ser. No. 62/502,904 filed 8 May 2017 and U.S. Provisional Patent Application Ser. No. 62/666,110 filed 3 May 2018 both of which are incorporated by reference as if set forth at length herein.

TECHNICAL FIELD

This disclosure relates generally to integrated optical systems, methods, and structures including photonic phased arrays. More particularly, it pertains to systems, methods, and structures including photonic phased arrays advantageously exhibiting superior speckle reduction characteristics.

BACKGROUND

As is known, the ability to precisely direct radiation beams at a desired area and detect backscattered radiation is of considerable importance to many contemporary technologies including—but not limited to—imaging, ranging, sensing, measuring, detecting, and communications which—in turn—find widespread applicability in scientific and medical instruments and systems, vehicular safety and control, robotic navigation, and line of sight communications. Given the importance and widespread contemporary applicability, systems, methods, and structures that reduce characteristic and undesirable speckle would represent a welcome addition to the art.

SUMMARY

An advance in the art is made according to aspects of the present disclosure directed to systems, methods, and structures that reduce speckle in optical systems and more particularly in optical systems employing photonic phased arrays.

BRIEF DESCRIPTION OF THE DRAWING

A more complete understanding of the present disclosure may be realized by reference to the accompanying drawing in which:

FIG. 3(A) collection aperture and its detector aligned for infinity detection (detector at focal point); FIG. 3(B) curved phase front focused behind detector; FIG. 3(C) beam incident at an angle focused off-center; and FIG. 3(D) distorted phase front generating a spread focal spot according to aspects of the present disclosure;

Figure 1:
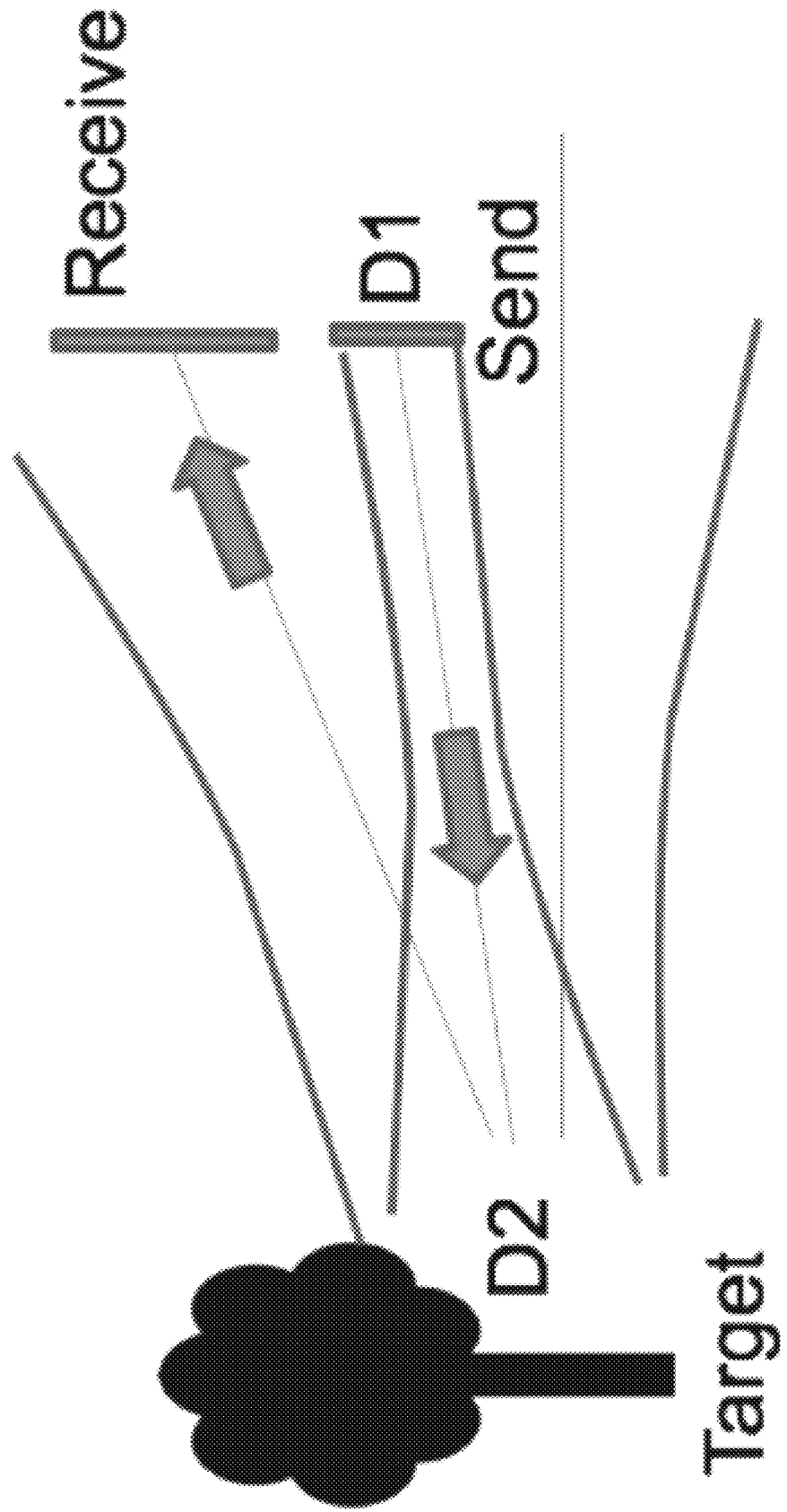
FIG. 1 is a schematic diagram showing an illustrative send/receive operation for an optical ranging apparatus wherein a send aperture emits a collimated (or focusing) beam toward an object that may be at an angle with respect to aperture opening and back scattered light is spread in space and is received (also possibly at an angle) by a receive aperture according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we note that photonic phased arrays have attracted considerable attention for many applications including imaging, ranging, sensing, free-space communications, etc. This interest has further accelerated given recent utilization of advanced lithography and etching techniques originally developed for CMOS applications to the fabrication of such phased arrays.

As is known, a photonic phased array can advantageously direct optical beams exhibiting a desired phase front(s) in precisely controlled directions. Of further advantage, the same or a similar phased array can be used to collect any light backscattered from objects in a field of view into which the directed beams were emitted.

Known further, the backscattered light spreads in all three dimensions and only a portion of the energy of the original light is collected by a receiving aperture. The backscattered light to be collected diminishes in intensity as the collecting aperture is moved away from the target, and the amplitude and the shape of the backscattered light undergoes transformation(s) as the light travels through a medium (possibly turbulent with fog, rain, temperature gradients, etc.) until it reaches the collecting aperture. Given such transformation(s), systems, methods, and structures that more efficiently collect such backscattered light would be welcomed by the art.

Accordingly, we disclose systems, methods, and structures that more efficiently collecting this non-uniform backscattered light and—where possible —reconstruct its shape.

As we shall show and describe, systems, methods, and structures according to aspects of the present disclosure include integrated optical phased arrays for multimode beam collection used in—for example—infrared imaging, accident avoidance, etc. Such integrated optical phased arrays may advantageously be CMOS-fabrication compatible silicon nano-photonics including a one-dimensional beam forming array wherein the amplitude and phase of the array's waveguide-based receivers are precisely controlled and backscattered, received light is routed to multiple of photodetectors for electronic postprocessing and reconstruction.

Of particular significance to this disclosure, a laser beam hits a target at a certain distance and light backscattered from that object is collected by the same or another aperture. With initial reference to FIG. 1, it may be observed that a send and receive aperture can both be emitting and collecting light at an angle with their surface normal. In some particular instances, the send and receive apertures are placed farther than the Fraunhofer range of each from the target object— but this is not always the case.

The Fraunhofer (or far-field) range is calculated by: $z=D^2/l$, where D is the size of the send aperture or the size of the illuminated spot on the object. It is noteworthy that, unless the send aperture is focusing the light, the illuminated spot on the wall ($D_2$) is larger than the send aperture size ($D_1$) and ($z_2 > z_1$). Therefore, it is possible that the collecting aperture is in the speckle Fresnel zone while the send aperture is operating in far field.

Figure 2:
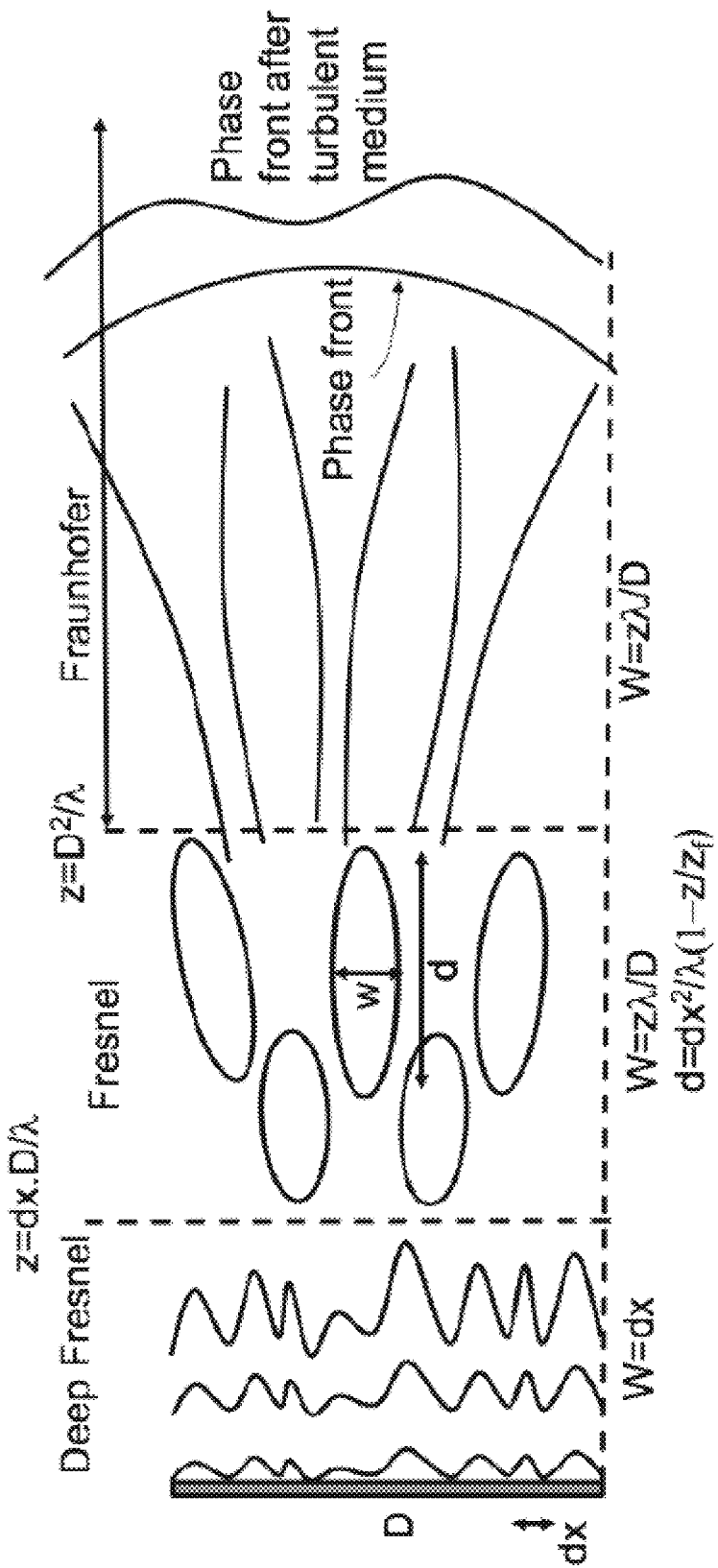
FIG. 2 is a schematic diagrams of illustrative speckle formation near a target (Deep Fresnel), middle distance (Fresnel), and in a far field (Fraunhofer range) wherein turbulent medium also adds phase irregularity to a spherical phase front at a far field according to aspects of the present disclosure.

Note that the laser light hitting a target (illuminating an area with the diameter D), with a roughness with characteristic correlation dx, will create speckle patterns (in the far field) with spot sizes of is λz/D, in which z is the distance to the object and D is the diameter of the illuminated spot (see, e.g., Van Cittert-Zernike (VCZ) theorem). A wavefront of the speckle pattern at the far field exhibits a spherical shape and turbulent media will add phase distortions to the phase front as shown illustratively in FIG. 2.

Figures 3A, 3B, 3C, 3D:
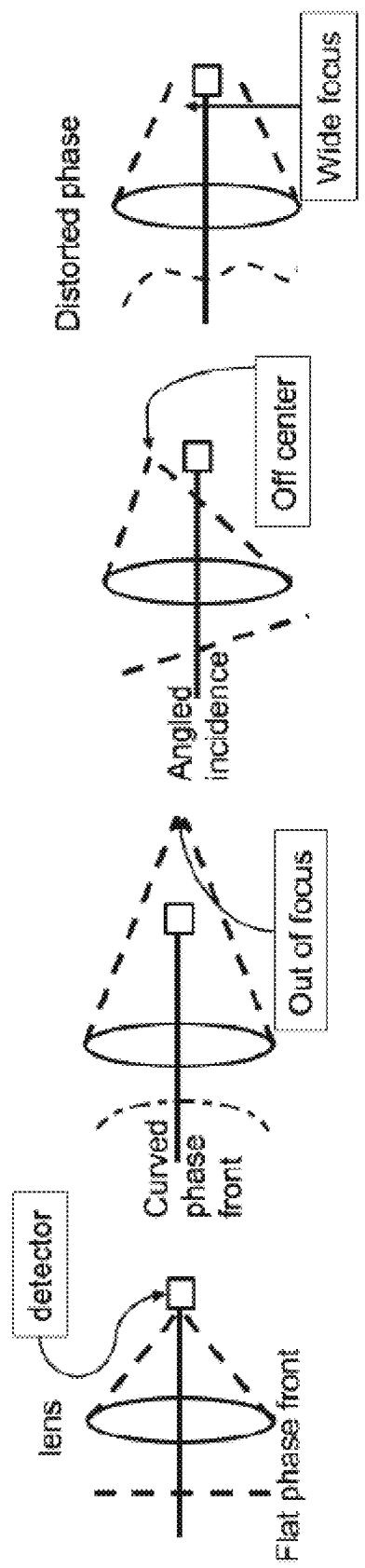
FIGS. 3(A)-3(D) are schematic diagrams of illustrative phase fronts showing.

Note further that a receiving aperture is not always perpendicular to the incoming beam. If the receiving aperture included a lens and a detector positioned at its focal point, the overall effect of these effects can be seen in FIGS. 3(A)-3(D). As can be seen in FIG. 3.(B)-FIG. 3(D), a curved phase front is focused on the back of the array, an angle incidence results in an off center focal point, and a distorted phase front leads in a wider than diffraction limited focal point.

Figure 4A:
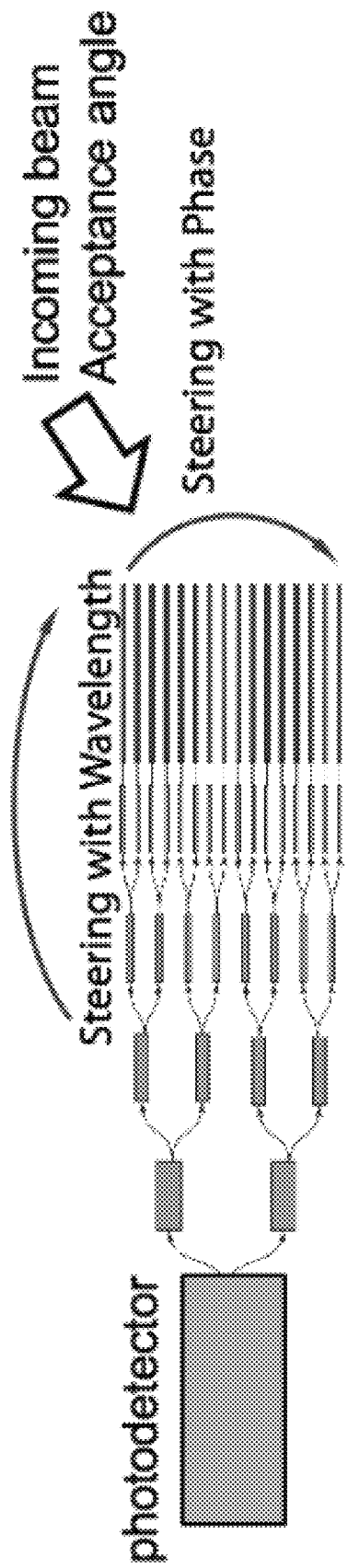
FIG. 4(A) is a schematic diagram of an illustrative one-dimensional phased array with phase and wavelength steering wherein when all elements are in phase the array emits in the vertical direction according to aspects of the present disclosure.

Note that in order to create flat and lens free compact send and receive arrays, the lens and detector shown illustratively in FIGS. 3(A)-FIG. 3(D) can be replaced by a phased array optically connected to one (or more) photodetectors. With reference to FIG. 4(A)—there is shown a one-dimensional phased array exhibiting both phase and wavelength steering.

Figure 4B:
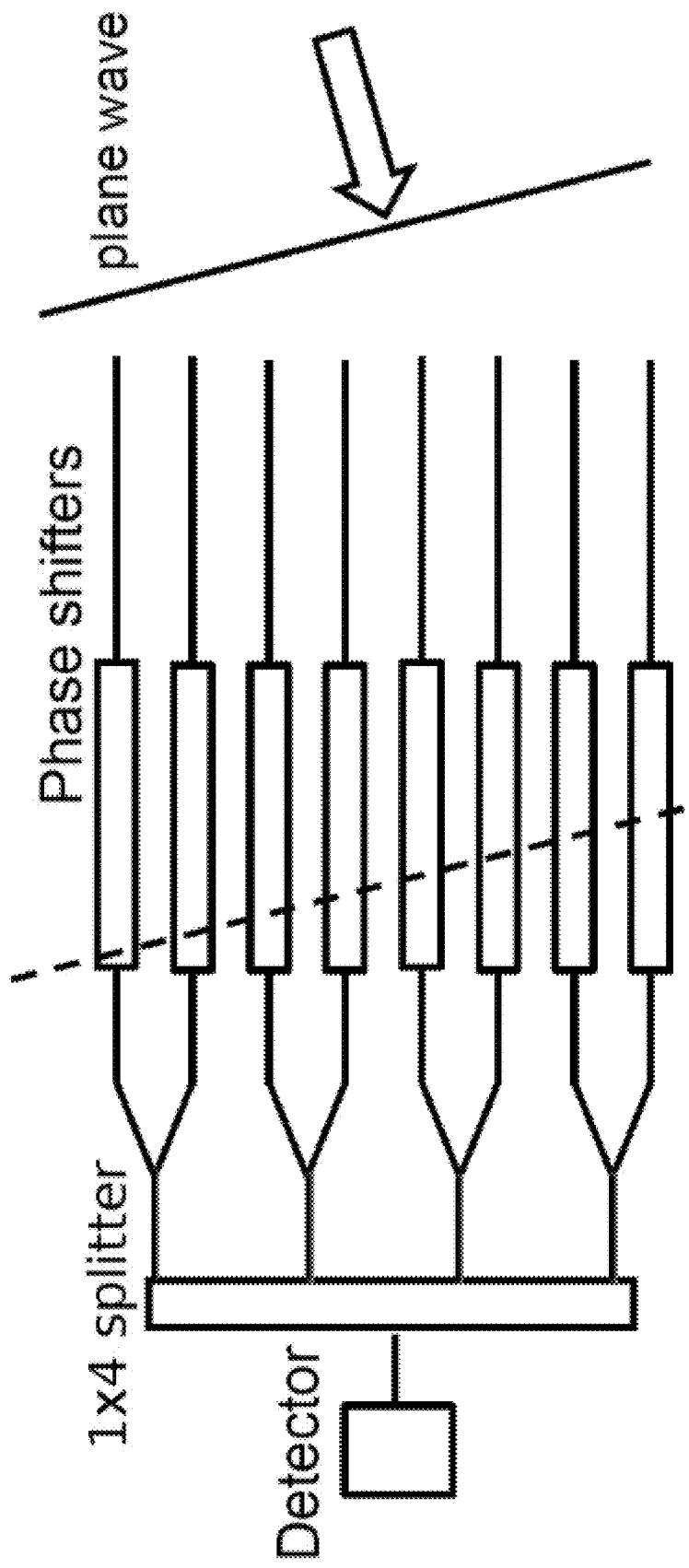
FIG. 4(B) is a schematic diagram of an illustrative one-dimensional phased array detector that may be any 1×N array including 1×8, etc., according to aspects of the present disclosure.

FIG. 4(B) shows an illustrative on-dimensional phased array detector including a 1×4 splitter connecting a detector to the array of phase shifters. Note that such a structure may exhibit a size of any 1×N array.

Figure 4C:
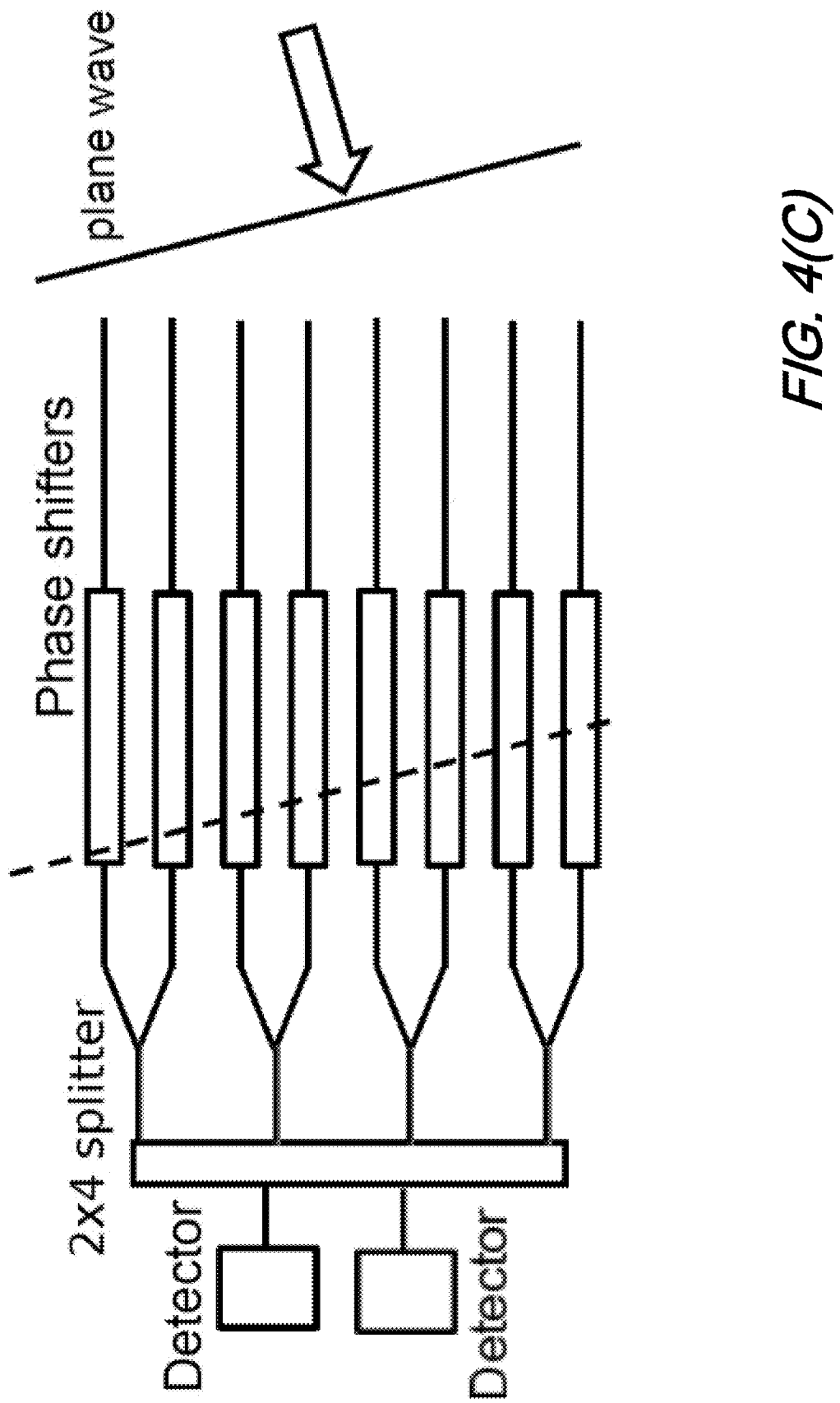
FIG. 4(C) is a schematic diagram of an illustrative phased array detector having two detectors connected to the phased array via an illustrative 2×4 splitter according to aspects of the present disclosure.

Similarly, FIG. 4(C) shows an illustrative phased array detector including a 2×4 splitter connecting two detectors to the array of phase shifters.

Note that with such structures, it is possible to scan a two-dimensional domain with an array of collecting micro-apertures (grating, dipole antenna, etc.) placed in a 2D array. Adjusting the phase of the emitters can steer the acceptance angle of the array in transverse and azimuthal directions.

One significant downside of such 2D arrays is that the antennas cannot be packed into a <l/2 grid as all the grating emitters, the tapers and the splitters are several times larger than the wavelength. As will be readily appreciated by those skilled in the art, whenever a system exhibits >l/2 periodicity the aliasing effect leads to one or several side-lobes showing up in the array factor and the overall array radiates (and receives) into (from) several spatial directions.

To address the packing limitation of the 2D array, the elements can be placed in a tree-based 1D array in which one or more detectors are "fed" by a tree of elements and long waveguide gratings that collect light coming from a specific direction for each wavelength. Note that if short and compact antenna are used instead of waveguide gratings, the acceptance angle in the longitudinal direction will be wider and the array will have a much smaller antenna again but a wider bandwidth. The benefit of such system is that—so long as the light is confined enough in the waveguides so that they do not cross couple—the elements can be brought into very close proximity of each other to suppress any array factor side-lobes. As can be seen in FIG. 4, such an array is steered by the phased control of antenna elements in the cross direction and the steering in the back/forward direction is achieved by the change in the wavelength of the collected incoming light.

Figure 5:
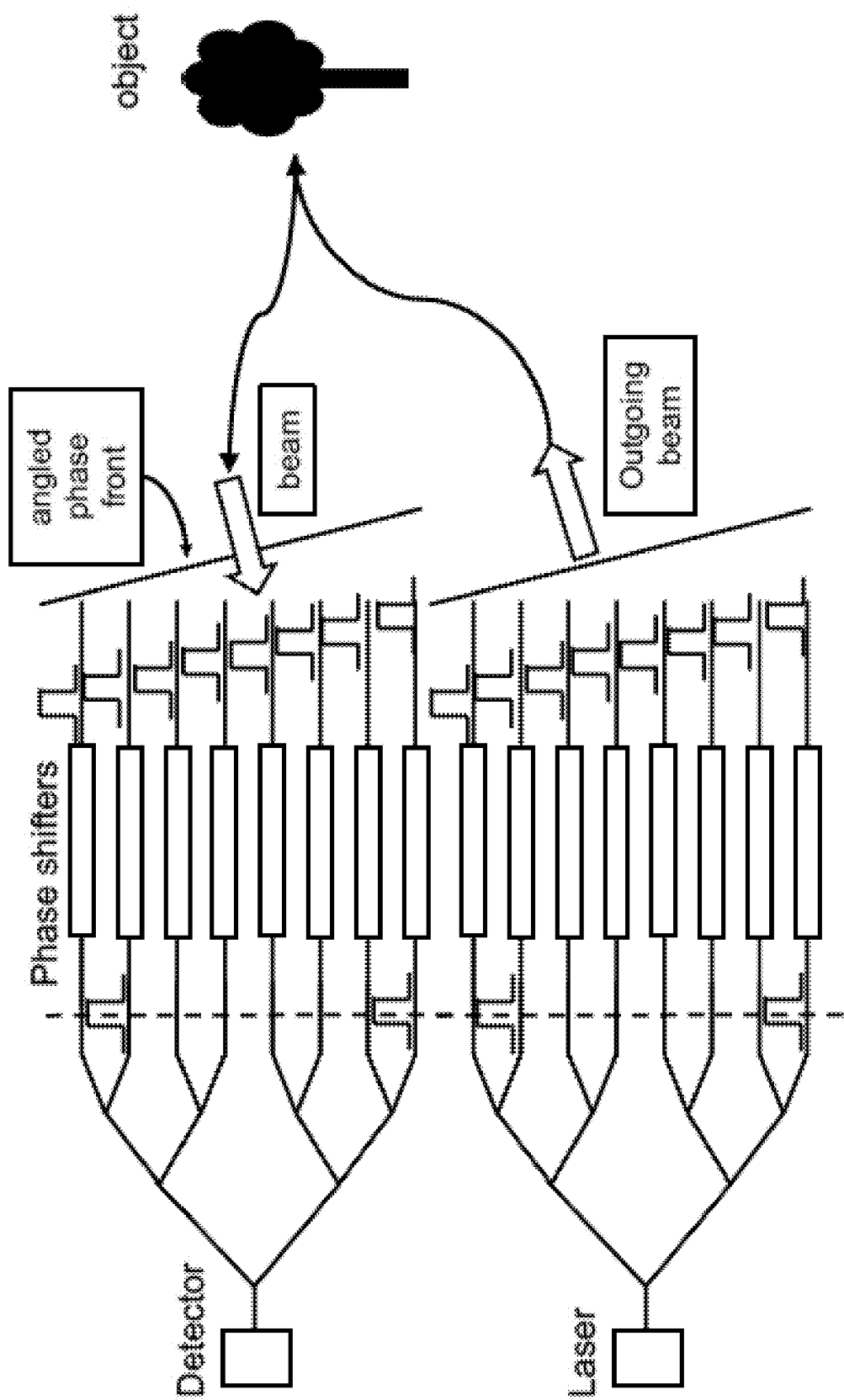
FIG. 5 is a schematic diagram of phased arrays for transmit/receive operations of a ranging operation wherein for a far target at a far distance (z>>D), backscattered field returns at a same angle as an outgoing field and a same phase shift pattern used at a send aperture may be used to focus returned signal(s) to the a detector according to aspects of the present disclosure.

Turning now to FIG. 5, there is shown an illustrative phased array configuration including both send array and receive array. As illustratively shown in that figure, the send array is optically coupled to a continuous wave (CW) or a pulsed laser, sends out a beam (phase front) into the far field wherein the direction of the beam in the lateral direction is controlled by the phase shifters. If an object is at a large enough distance from the array, an approximately flat phase front plane wave is received by the receive array at almost the same angle as the outgoing beam.

The receive array, then must have the same phase shift pattern to combine the light collected by all the phase shifters into an in-phase (and constructive addition) signal. Because of this reciprocity (the phase required for an outgoing plane wave and an incoming plane wave are exactly the same), the two arrays specified above can be replaced by one array that performs both emission and collection operations.

Figure 6:
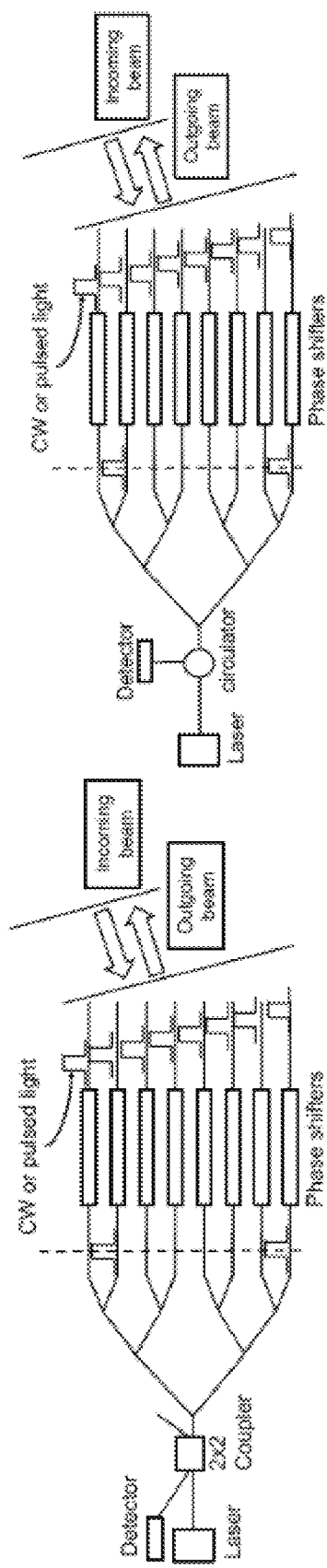
FIG. 6 are schematic diagrams of illustrative optical circuits showing that a same array may function as both send and receive apertures wherein (left) a 2×2 coupler sends a portion of the return signal to a detector and (right) a circulator isolates send and return signals according to aspects of the present disclosure.

As will become apparent by those skilled in the art, there are at least two possible configurations of such an arrangement using either: (left) a 2×2 coupler at the beginning of the array to send half of the laser light out and collect half of the backscattered light; or, (right) using a circulator to isolate the outgoing light from the incoming collection. FIG. 6 shows such illustrative configurations.

If we assume a flat phase front radiation, the outgoing light travels in a beam exhibiting a slightly curved—but uniform flat phase front(s). The beam of light hits an object with surfaces exhibiting varying level of roughness and backscatters in all directions. Depending on the material and structure of the scattering object, different levels of light backscatters.

Figure 7:
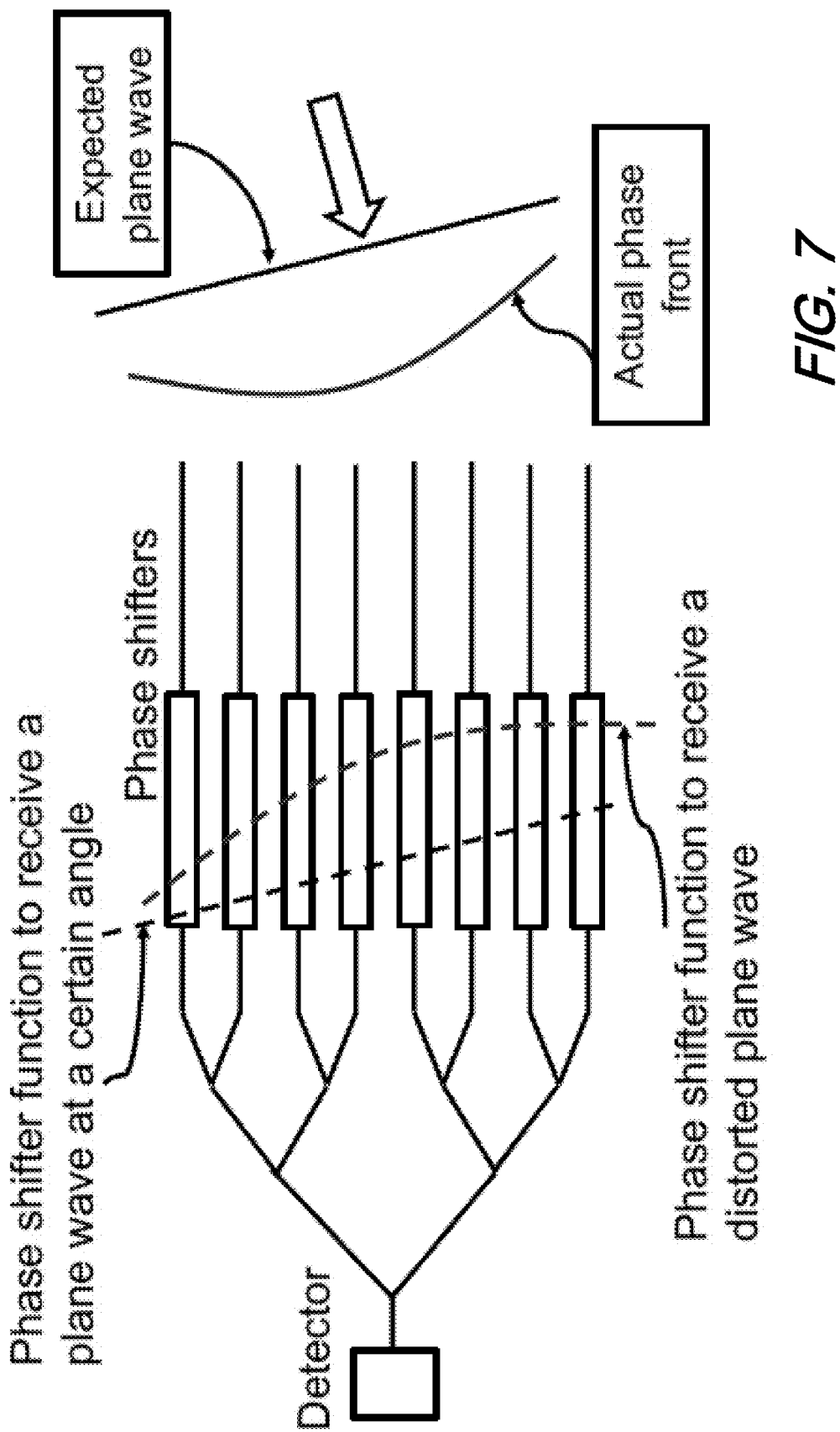
FIG. 7 is a schematic diagram showing that if a shape of a distorted phase front is known, a phase distribution—which is designed to look for a certain plane wave angle—may be corrected for the phase distortion according to aspects of the present disclosure.

For our purposes herein, we assume a typical object reflects 10% of the light with a cosine dependence of angle of view to the perpendicular to the surface. The returning backscattered light will exhibit a non-flat phase front depending on the distance of the object, its surface geometry, and the medium turbulence. As shown illustrative in FIG. 7, if two separate apertures were used for sending and receiving operations, and the shape of the phase front was known at each moment in time, the phase shifters may be fine-tuned to correct for the phase front aberrations from the expected angled plane wave.

Note that in many situations the distance and shape of the target are not known, the turbulence in the media changes rapidly, and the send and receive arrays are not separate (either same aperture or the same electronically controlled phase function), fine tuning a phase function on the receiving phase array is not practical.

Another important factor to consider is the speckle pattern generated by the backscattering target. Depending on the size of the emitting array and the distance to the object, the outgoing beam illuminates an area on the object that can be predicted both by a Fourier transform of the send aperture (if the object is farther than the Fraunhofer distance) or by an expansion of the outgoing beam in a collection of Hermit-Gaussian beams. The larger the send aperture is the smaller its divergence will be when propagating from the send aperture to the object. The area illuminated by the beam can be modeled by millions of independent scattering sources each emitting light with a random phase in three dimensions. The collection of scatters can create a complex intensity and phase pattern such as shown in FIG. 8.

Note that the size of the speckle pattern (backscattered unto the receiving phased array) according to Van Cittert-Zernike (VCZ) theorem is λz/D in which z is the distance to the object and D is the diameter of the illuminated spot. The size of illuminated spot, assuming a Gaussian abeam propagation from a 4 mm send array at 100 m distance for a 1550 nm light beam is 5 cm across. Such a spot size—when viewed from a receiver 100 m away—produces a speckle pattern having a speckle size of approximately 3 mm which is comparable to the 4 mm array size. When such a light pattern—especially with unknown phase distribution across the array hits the receive window—the coupling into the fundamental mode of the array can vary significantly depending on the phase distribution.

Figure 9:
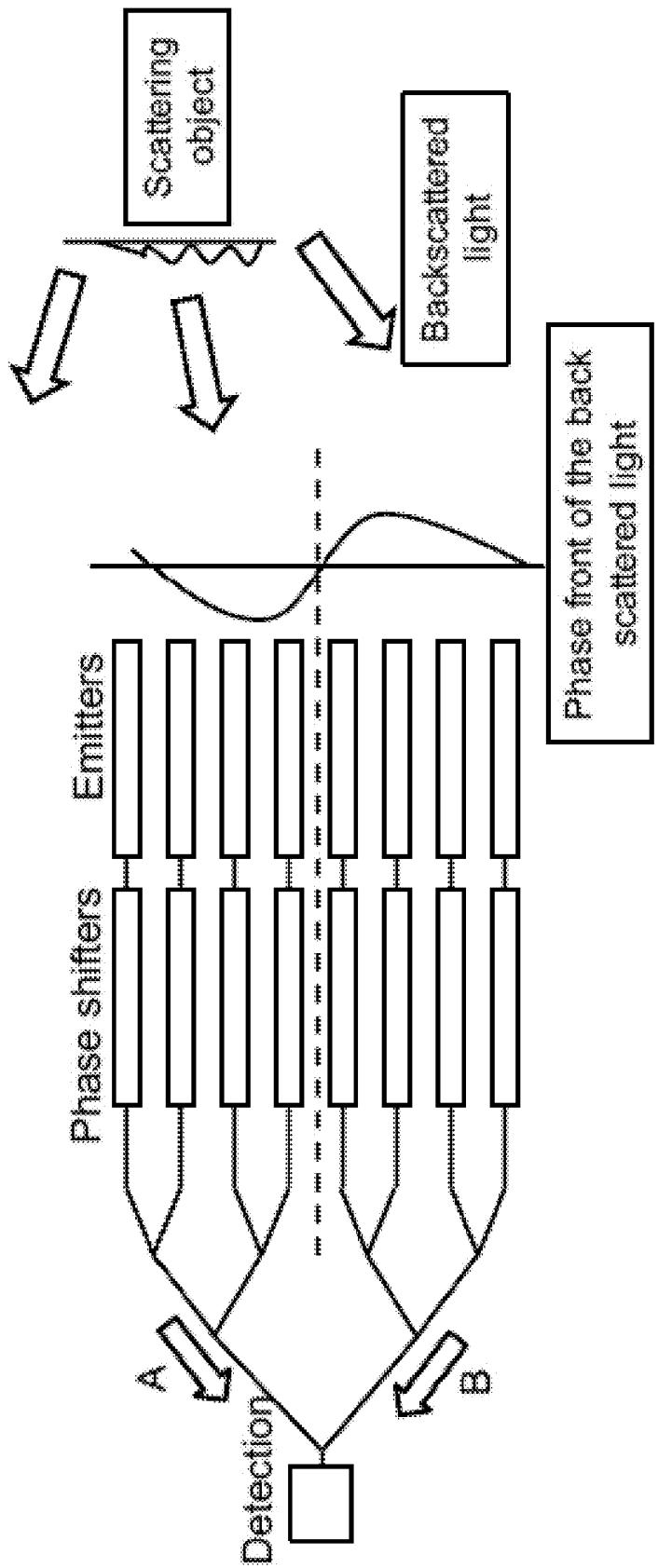
FIG. 9 is a schematic diagram of an illustrative phased array showing a speckle pattern with an odd phase front does not couple to the fundamental mode of the phased array and light shown with arrows A and B interfere out of phase according to aspects of the present disclosure.

For example, if the phase of the backscattered light is an odd function across the array, there will be zero light collected into the fundamental mode of the array which has uniform amplitude and constant phase across the array. As shown in FIG. 9, if the speckle pattern has an odd phase distribution it couples to the upper and lower half of the array with opposite phase and the resulting coupled light (as shown with arrows A and B in FIG. 9) destructively interfere.

Figure 8:
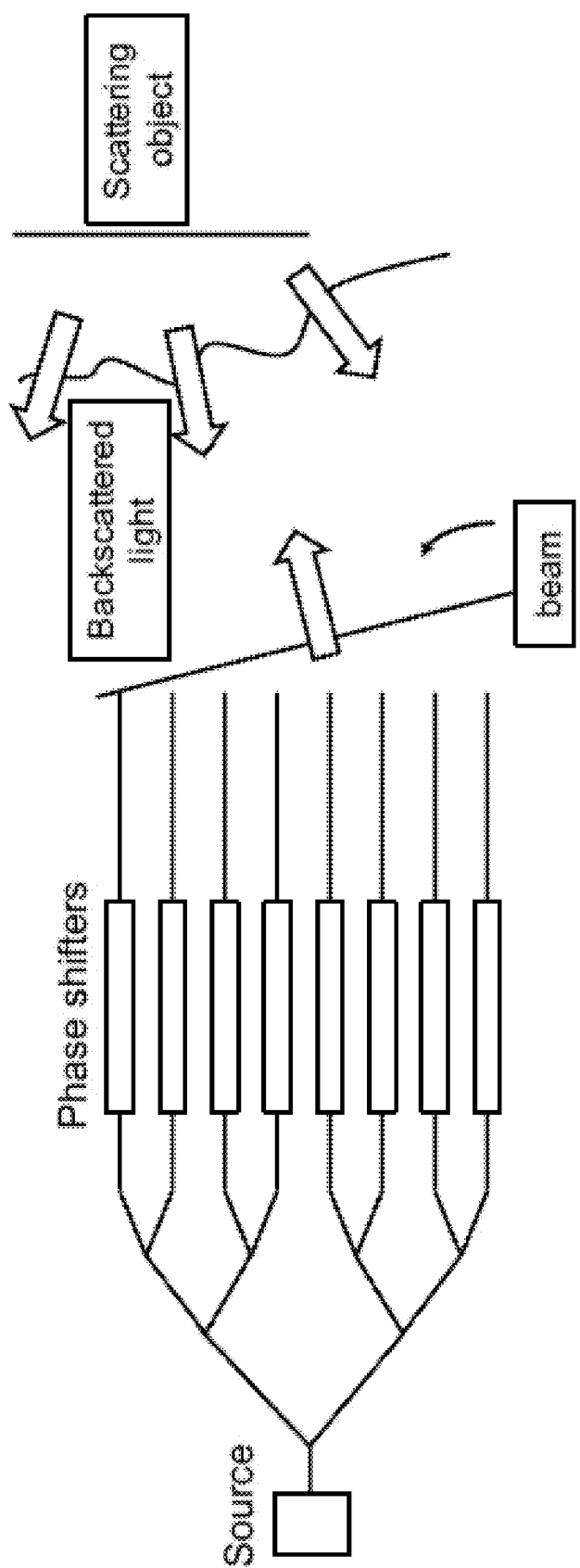
FIG. 8 is a schematic diagram of an illustrative phased array showing backscattered light exhibits a complex amplitude and phase pattern and speckle pattern generated depends on the size of the laser spot, the distance to the target, and surface topology according to aspects of the present disclosure.
Figure 10:
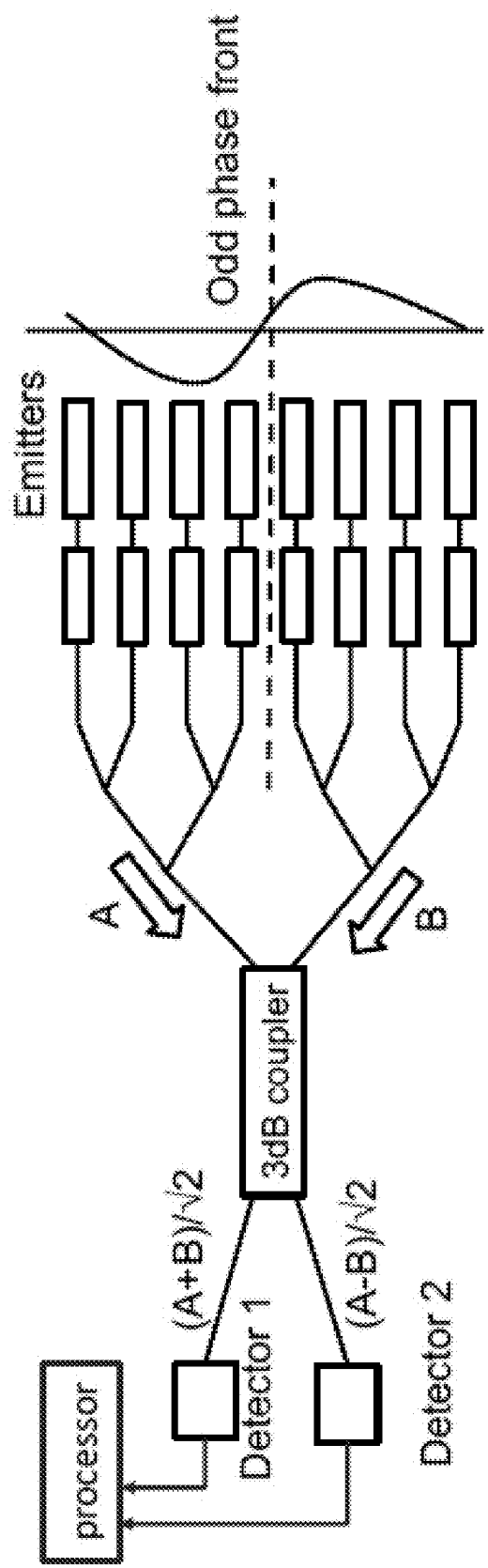
FIG. 10 is a diagram of an illustrative phased array showing that by adding a four-port coupler at a first stage of the receiving tree, light indicated by arrows A and B and still be detected at photodetector 2 even though they are out of phase by 180 degrees and signals from detector 1 and detector are sent to processor to regenerate signal input light according to aspects of the present disclosure.
Figure 11A:
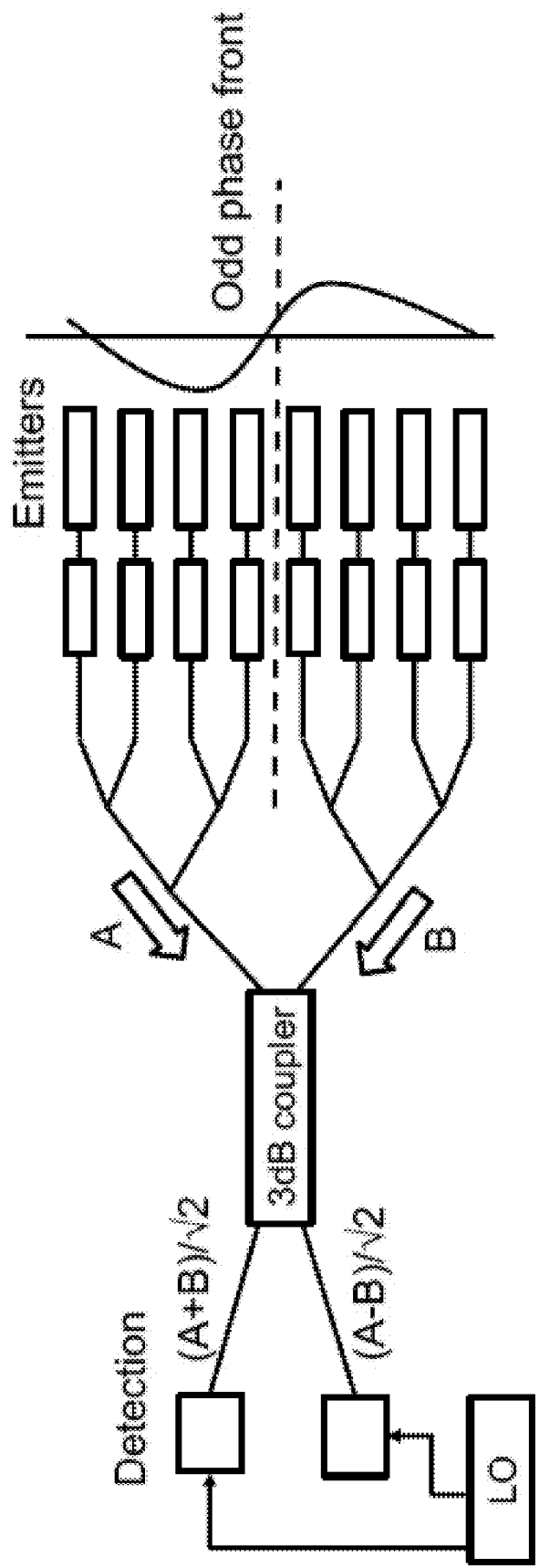
FIG. 11(A) is a schematic diagram of an illustrative phased array showing two receiver units with their local oscillator inputs generating heterodyne signals corresponding to odd and even components of the phase front according to aspects of the present disclosure.

If the three-port splitter in FIG. 8 is replaced with a four-port coupler, the out of phase elements of A and B can be added into the port of the coupler as shown in FIG. 9. The four-port splitter couples the symmetric field distribution across the horizontal axis to its upper port and the asymmetric filed patters are coupled to the lower port. Therefore, if fields A and B are 180° out of phase (corresponding to an odd speckle pattern hitting the receiving array), they can still be detected directly as is illustratively shown in FIG. 10 or with a local oscillator as illustratively shown in FIG. 11(A).

Figure 11B:
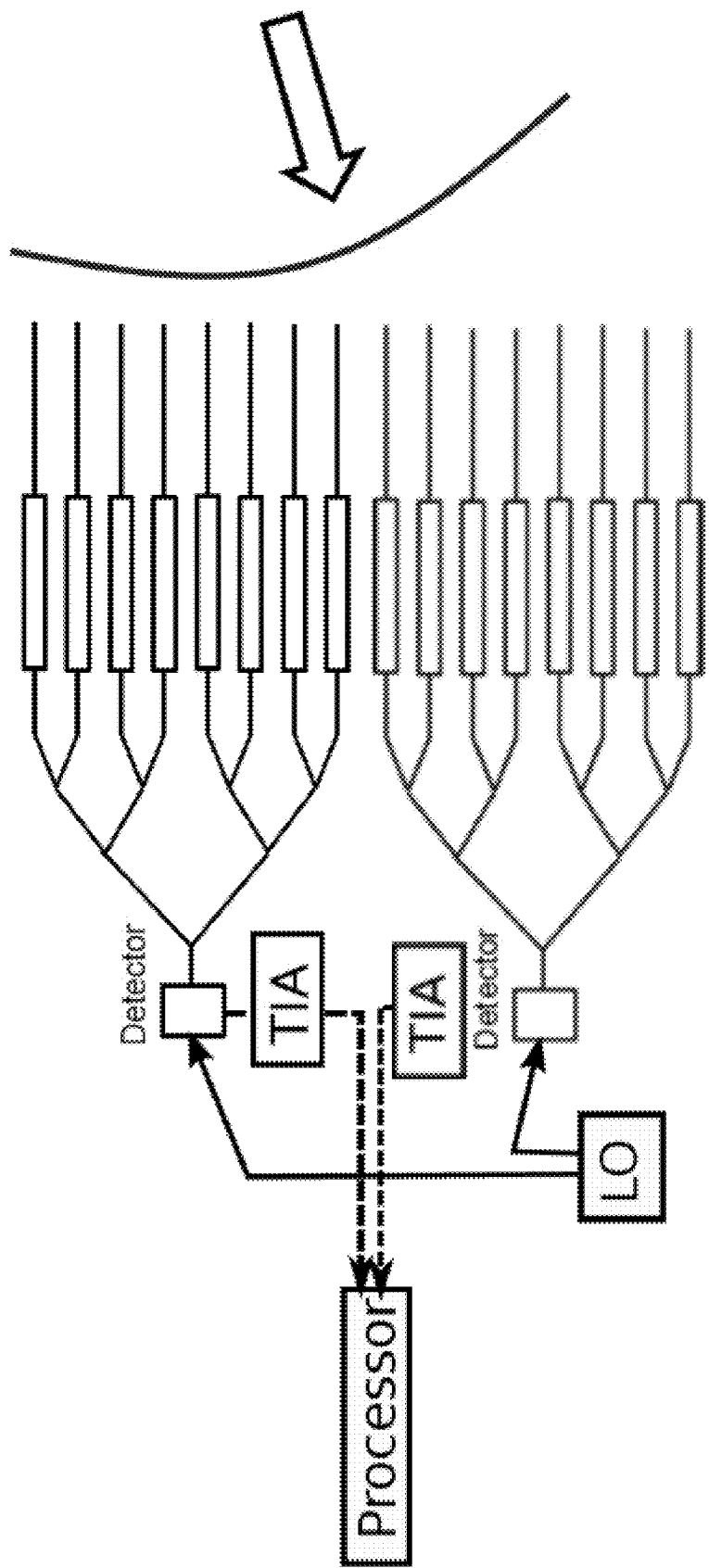
FIG. 11(B) is a schematic diagram of an illustrative phased array showing two receiver units with their local oscillator units and a processor connected thereto via intermediary amplifiers according to aspects of the present disclosure.

FIG. 11(B) illustratively shows a configuration in which a pair of detectors are interconnected with a local oscillator and a processor is connected to the detectors via amplifiers.

Note that replacing the first splitter with a four-port coupler that couples both odd and even modes, adds one modality (odd phase) to the array but still more complicated phase and amplitude patterns are not captured. Accordingly, systems, methods and structures according to the present disclosure advantageously add another pair of four-port couplers to the system illustrated in FIG. 10. This can be done in two different configurations.

Figure 12:
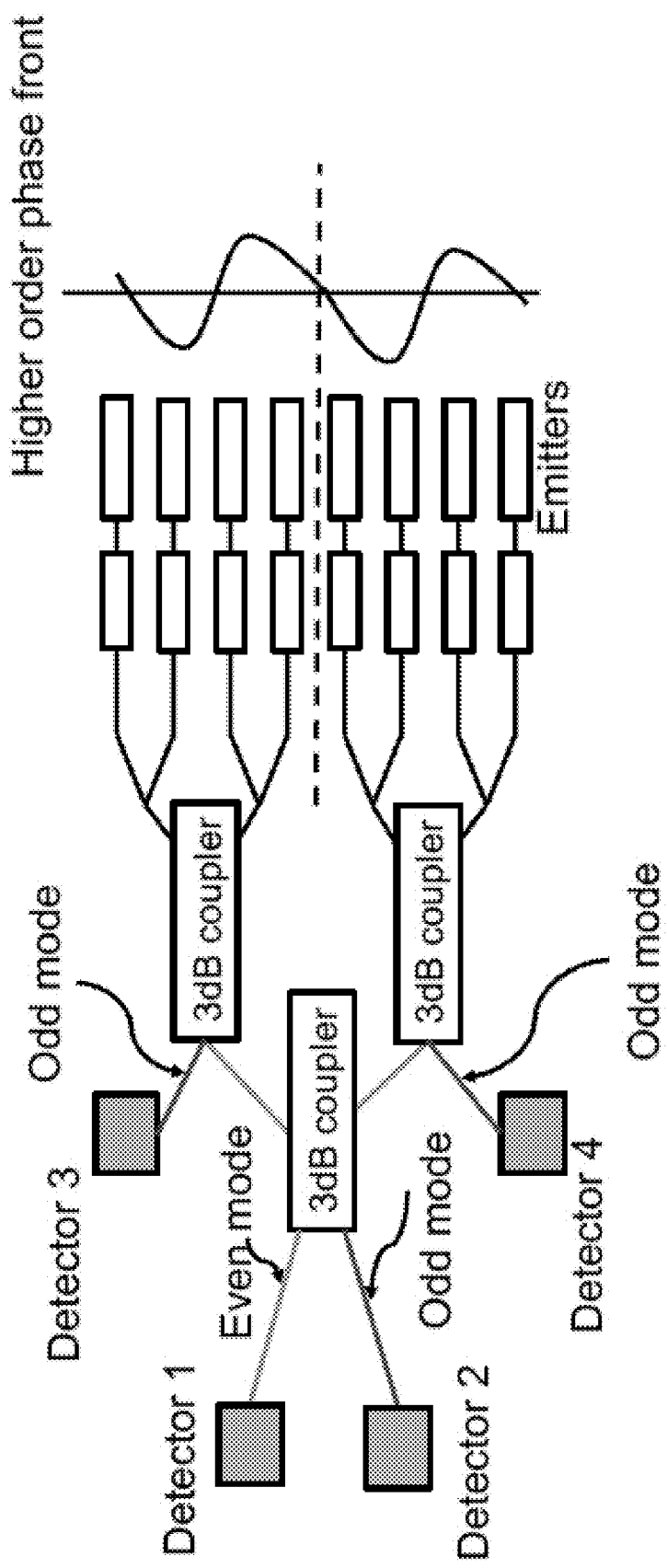
FIG. 12 is a schematic diagram of an illustrative phased array showing that by adding two more four-port couplers at the second stage of the receiving tree, odd modes in the upper and lower half trees are captured and detected according to aspects of the present disclosure.
Figure 13:
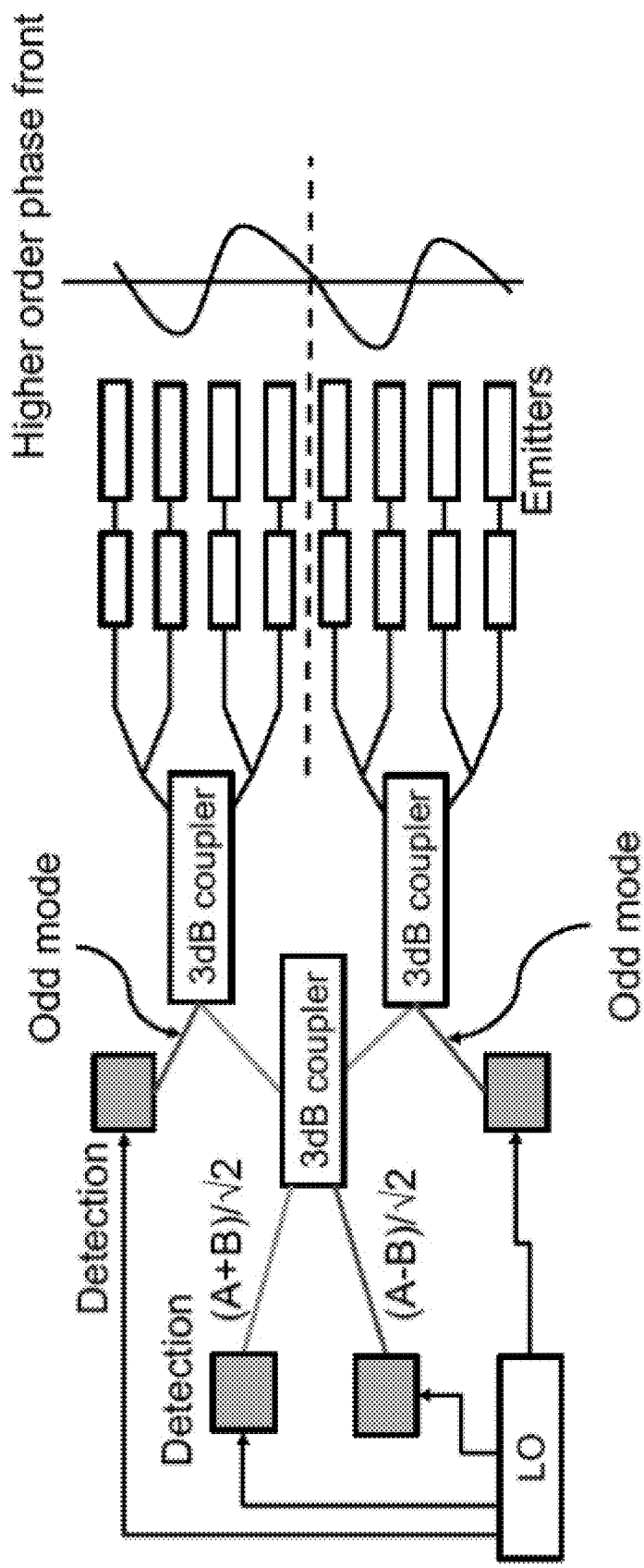
FIG. 13 is a schematic diagram of an illustrative phased array showing that by adding two more four-port couplers at the second stage of the receiving tree, odd modes in the upper and lower half trees are captured wherein a local oscillator is fed to all receiving blocks for a heterodyne detection scheme according to aspects of the present disclosure.

A first configuration according to aspects of the present disclosure—illustratively shown in FIG. 12 and FIG. 13 includes two four-port 3 dB couplers positioned at the second level of the tree. The odd modes of the upper and lower half of the tree are directed toward the second level photodetectors (Detector 3 and Detector 4) and the signals generated by them is post-processed and added electronically.

The even modes of the half arrays are applied to the first level coupler and are analyzed in a manner similar to that configuration shown previously in FIG. 10.

Figure 14:
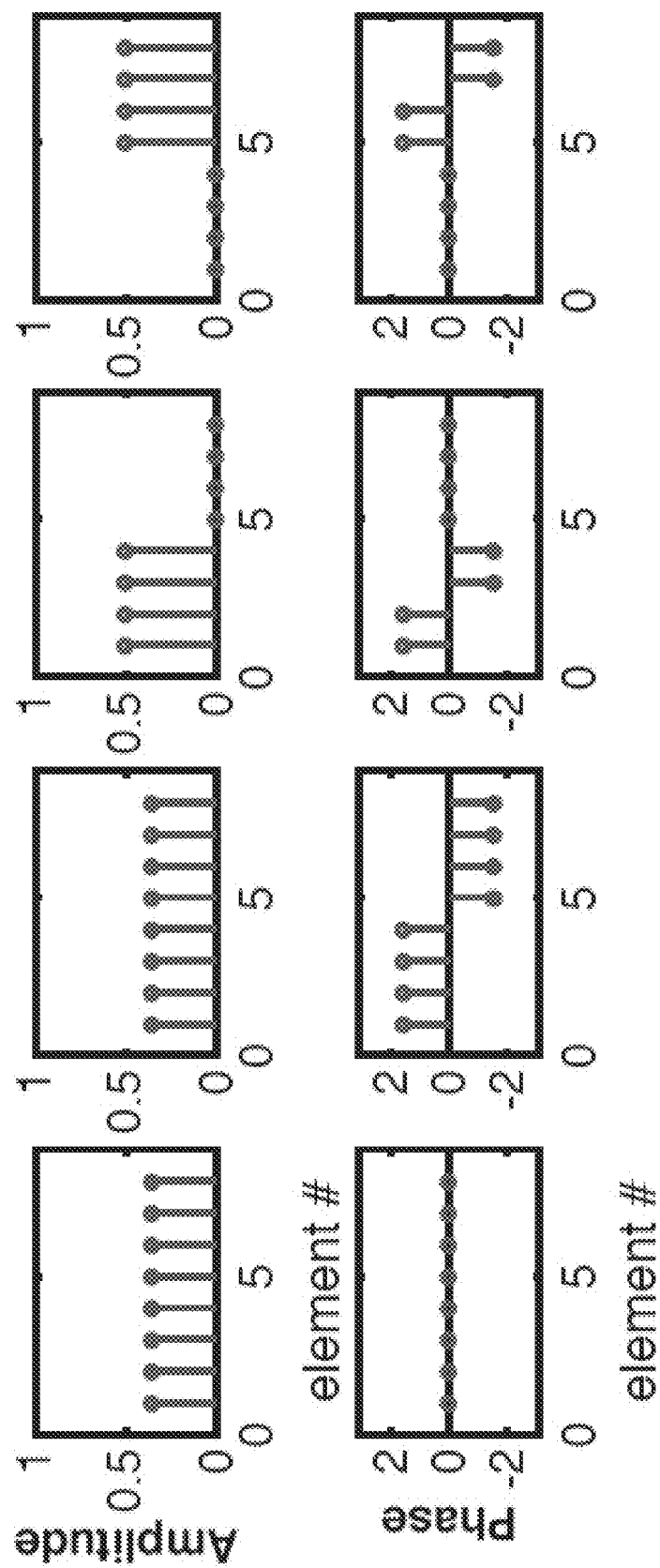
FIG. 14 is a schematic diagram showing basis vectors for expansion of an incoming phase front into a multimode detection array according to aspects of the present disclosure.

With reference to FIG. 14, we note that an incoming wave, with an arbitrary distribution of amplitude and phase can be expanded into a four-dimensional space for which the basis vectors are the field distributions that excite each photodetector with a unity signal may be represented by $$E_j = \sum_1^N (E \cdot b_j^*)$$

in which the vectors b are the basis vectors for the expansion space. The difference between the configurations in FIG. 12 and FIG. 13 is that because the one shown in FIG. 12 lacks a heterodyne detection scheme with a local oscillator, the phase information of each of the overlaps is not preserved and only the amount of power that is exciting that basic vector (phased array mode) is measured. In the configuration shown in FIG. 13, on the other hand, the shape of the incoming wave can be reconstructed (as much as only four modes in the expansion space allows).

We note at this point that the detection functions illustrated in at least FIG. 13,—among others—in which a local oscillator is employed for signal extraction, the detection function may include balanced detectors that include a splitter or the detector functions may include I/Q detection wherein four I/Q detectors and 90 degree hybrids are employed for such detection. In such configurations, the local oscillator will be operatively connected to each of the balanced detectors via the splitter(s) or operatively coupled to the four I/Q detectors via the 90 degree hybrid.

The vectors shown in FIG. 14, are a set of four modes describing the system corresponding to the four photodetectors shown in FIG. 12. Those skilled in the art will now appreciate that it is possible to create other types of basis vectors if the configuration of the array is slightly modified. For example, it is possible to move all the photodetectors to the second level and effectively remove the first level of the tree as shown illustratively in FIG. 15(A).

Figure 15A:
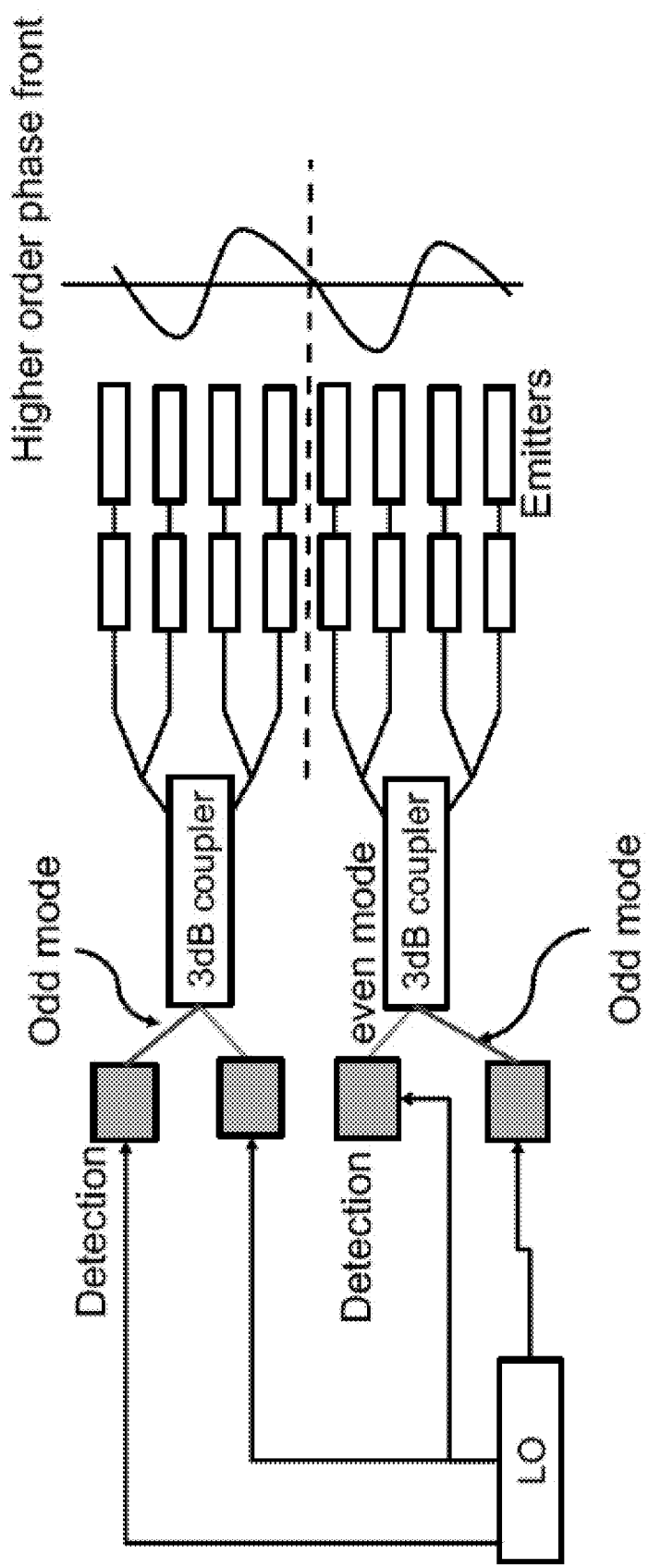
FIG. 15(A) is a schematic diagram of an illustrative phased array showing that it is possible to perform all photo detection at the second level of a distribution tree which advantageously analyzes upper and lower half of the array separately wherein the basis vectors for this configuration is different from that shown in FIG. 11—according to aspects of the present disclosure.

The configuration illustratively shown in FIG. 15(A) can advantageously analyze the upper and lower half of the array independently. The optical configuration is simplified compared to the device shown in FIG. 13 but more electronic and RF post processing is required.

Figure 15B:
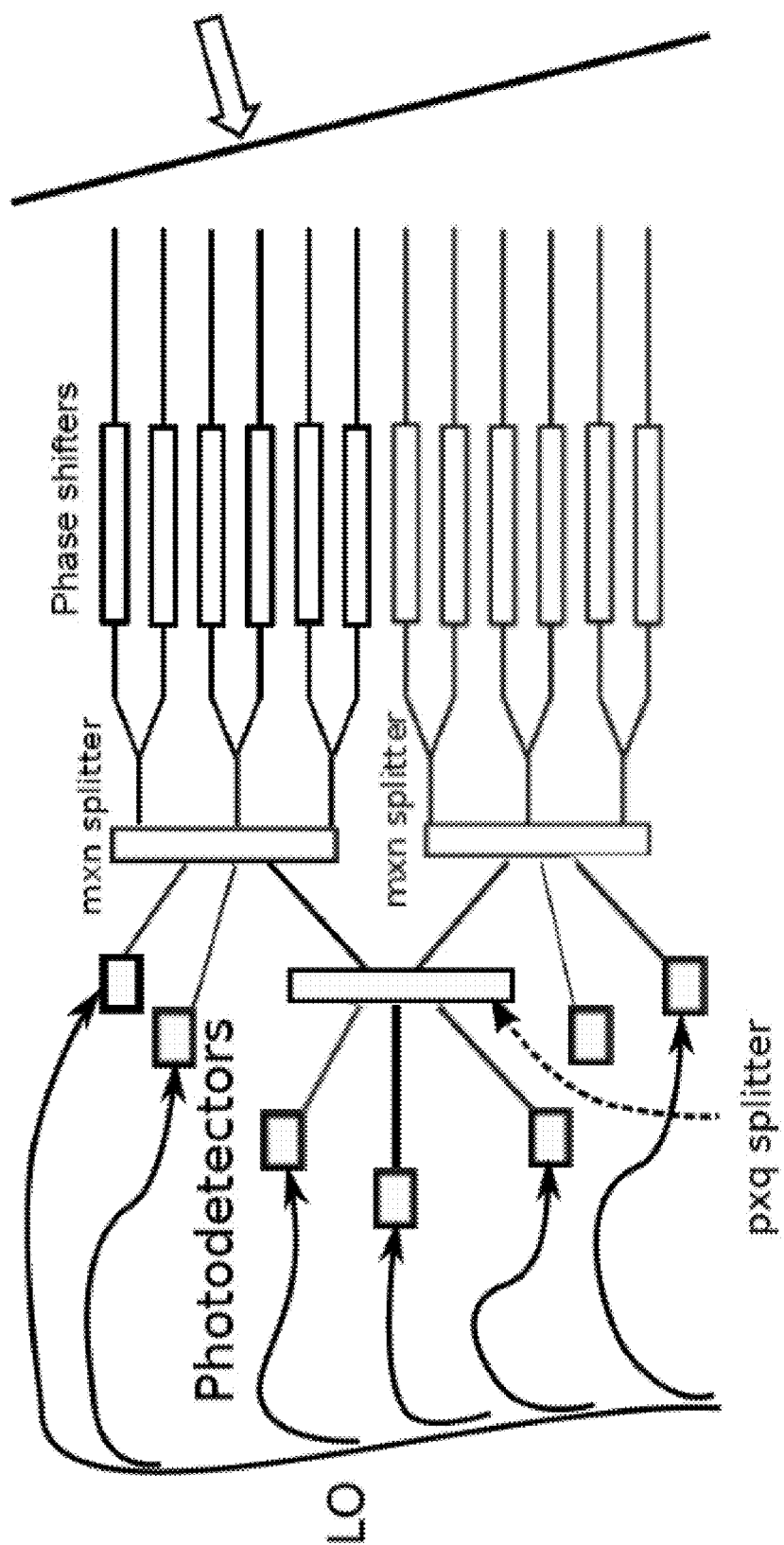
FIG. 15(B) is a schematic diagram of an illustrative phased array interconnected via multiple M×N splitters which in turn feed a P×Q splitter and a number of detectors according to aspects of the present disclosure.

A variation of that shown is the configuration of FIG. 15(B) wherein a number of M×N splitters are employed along with a P×Q splitter each of which is connected to one or more detectors. Note further that the detectors may utilize a local oscillator in a balanced or I/Q configuration(s) noted previously.

Figure 15C:
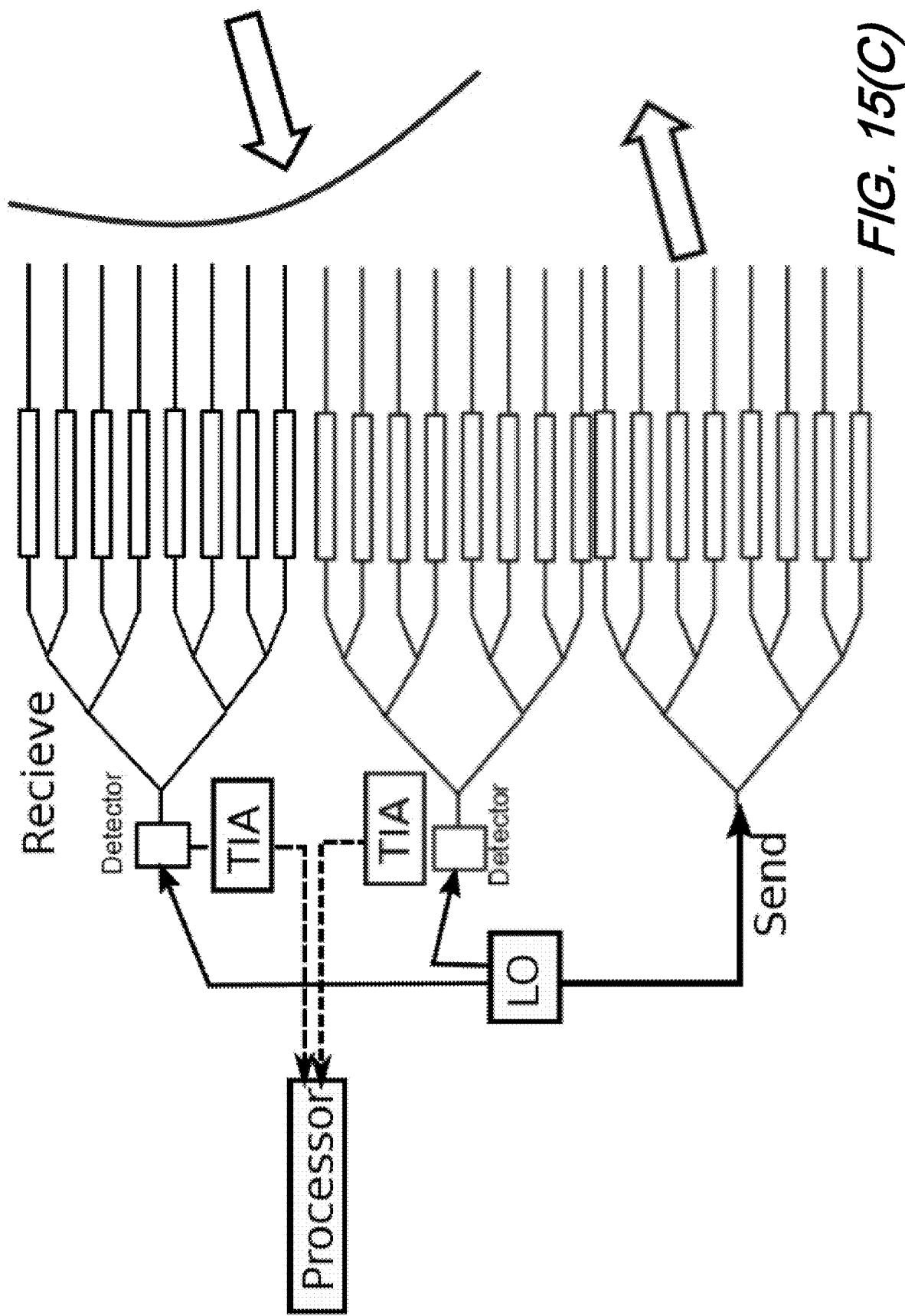
FIG. 15(C) is a schematic diagram of an illustrative phased array including both send and receive apertures wherein a single structure includes a single send aperture structure and multiple receive aperture structures according to aspects of the present disclosure.

Yet another variation is shown in FIG. 15(C) is a single structure including a single send aperture structure and multiple receive aperture structures that may advantageously employ any or all of the principles disclosed herein in various alternative configurations. Note that while only a single send aperture structure and multiple receive aperture structures are shown, there may be multiple send apertures and many more receive apertures than those shown wherein the receive apertures outnumber the send apertures in the structure.

For example, for a uniform and flat phase illumination of the array, the signal on the top and bottom detectors are zero and the signals from the two middle detectors should be coherently added to achieve the full response. Note that there was no need for this operation shown illustratively in FIG. 12 as this coherent addition is performed in the optical domain in that configuration.

Note further that a direct detection scheme with this configuration such as that shown in FIG. 15(A) is not beneficial as the lost phase information makes this array function as two smaller arrays with broader antenna gain functions and no added signal to noise benefit. This configuration, when operated in heterodyne mode with a local oscillator, preserves the phase information of the two half arrays and will have the same antenna gain function as the large full array. On the other hand, the signal to noise performance of this system is slightly compromised compared to that one the one shown in FIG. 13.

As an example, if both systems are illuminated with a uniform plane wave with a flat phase front, only one detector in the structure shown in FIG. 13 is illuminated. The signal to noise of this reception operation (performed with a balanced detection scheme and with a local oscillator coherent with the signal and large enough) is shot noise limited. As the same amount of the signal and local oscillator power is distributed between more detectors and coherently added, the overall signal level does not change but the shot noise from all the detectors increases. Therefore, eliminating lower level detectors (such as the ones placed at the base of the whole larger array), even though it simplifies the array design, would lower the SNR of the system.

Note that the system we discussed so far analyzed the incident light as an addition of four fundamental modes. The more detectors that are placed at the higher levels of the system, the more information can be attained from the collected light and both mode reconstruction and SNR improves as long as only detectors with appreciable power are included in the post-processing. Note that according to aspects of the present disclosure, more levels of the tree can be configured with four port splitters and photodetectors so long as the tight spacing between the higher levels of the tree permits photodetectors and four-ports splitter being physically fitted in the tree.

Figure 16:
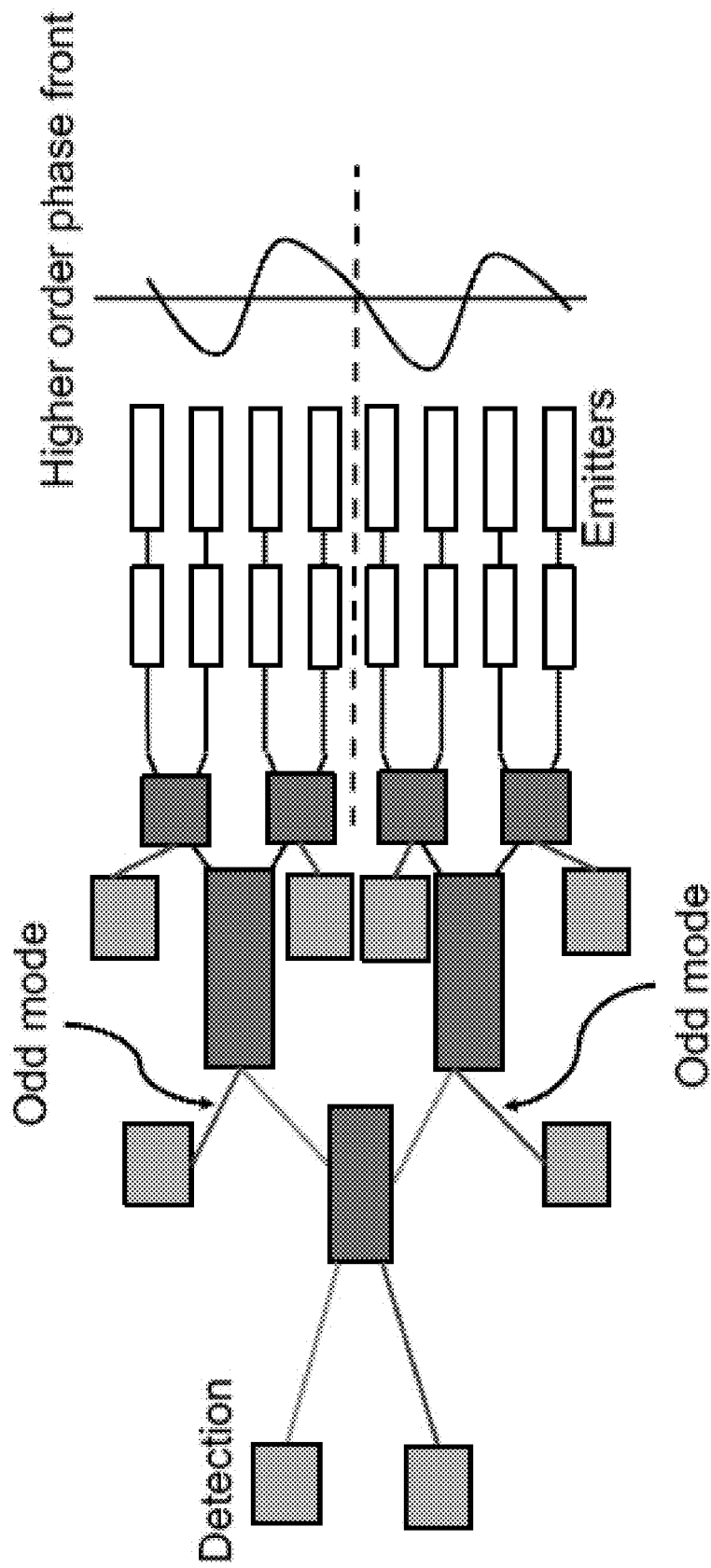
FIG. 16 is a schematic diagram of an illustrative phased array showing a system with 8 basis vectors may advantageously reconstruct more details of the incoming wave amplitude and phase distribution according to aspects of the present disclosure.

As a simple example, FIG. 16 shows a system with 8 fundamental collection modes (basis vectors). The detectors placed at the base of the tree are more important as they correspond to a tighter field of view and larger antenna gains. In this configuration, the photodetectors at the first level of the tree still receive the most of the power if the array is uniformly illuminated. Nevertheless, the detectors at the higher levels of the tree will be helpful if a speckle pattern with variations smaller than the whole array size is generated at the collection aperture.

Figure 17:
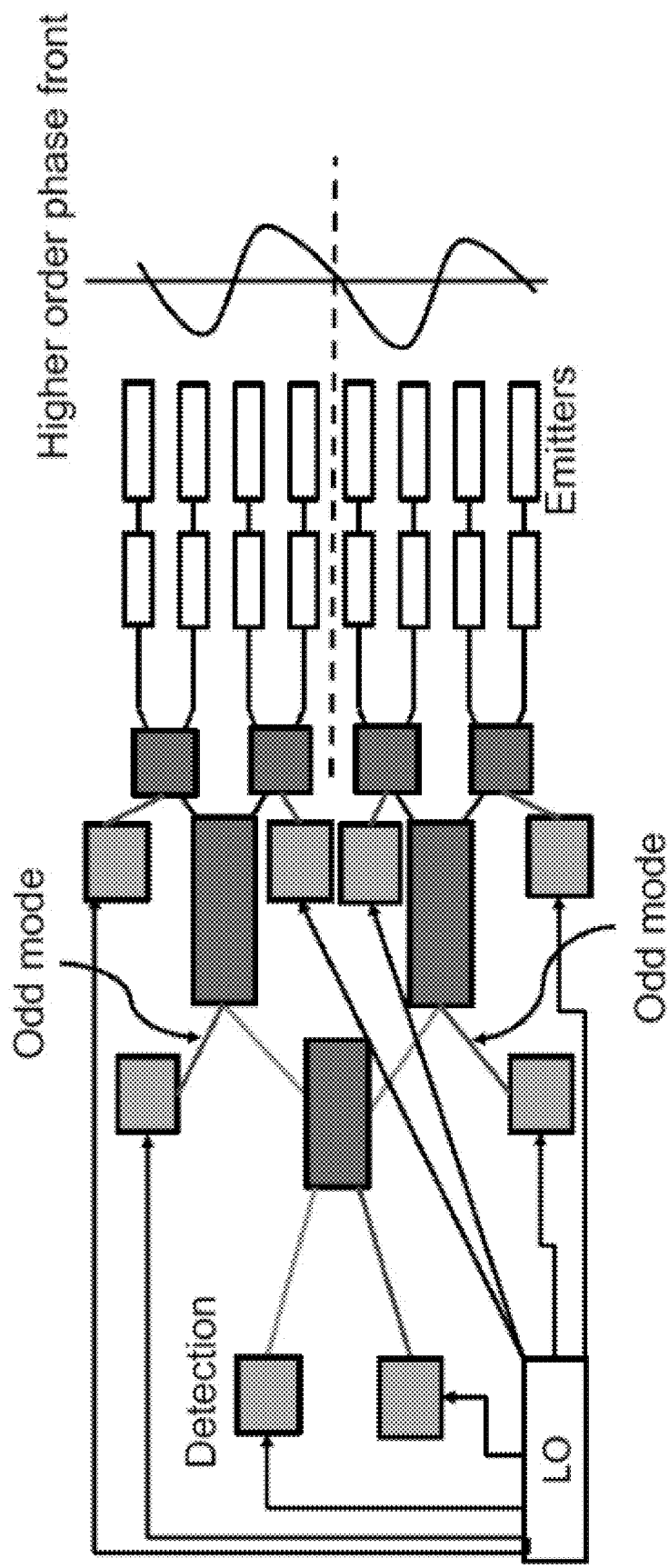
FIG. 17 is a schematic diagram of an illustrative phased array showing additional 4-port couplers and photodetectors added to higher levels of the distribution tree if the spacing between elements allows placement of the photodetectors according to aspects of the present disclosure.

If, however, the phase information between the detectors is to be preserved (in a heterodyne detection scheme as shown in FIG. 17) the LO should be delivered to all the detectors placed in between the tree branches which makes low loss waveguide crossings essential. Similar to that configuration illustratively shown in FIG. 15, the lower level optics and photodetectors can be eliminated leading to simpler optical arrays and less crossings needed at the expense of more electronic post processing and degraded noise performance for the fundamental array modes as the electronic addition of the signal from all photodetectors will also sum up the shot and dark noise elements from all the photodectors.

Figure 18:
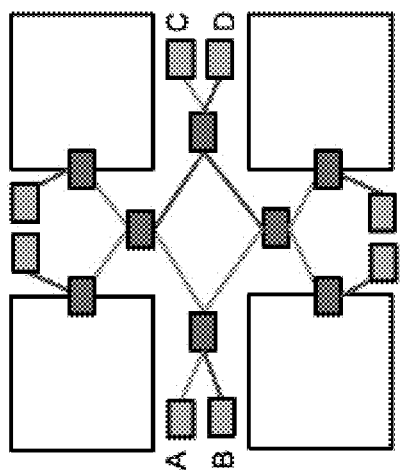
FIG. 18 is a schematic diagram of an illustrative two-dimensional receiving aperture operating in a multimode detection scheme wherein (left) a four-mode system and (right) a system with eight modes according to aspects of the present disclosure.
Figure 18:
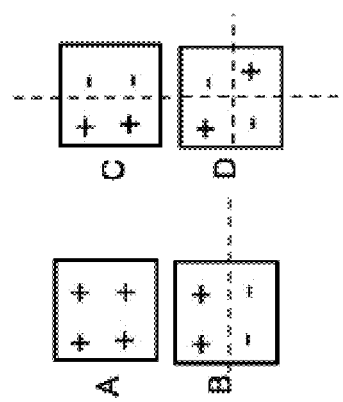
Figure 18:
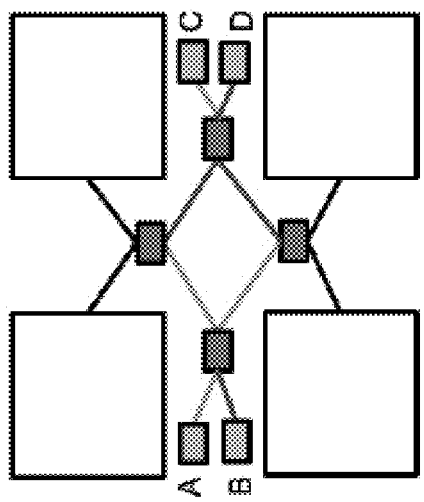

Note that multimode detection using phased arrays can advantageously be applied in two dimensional arrays. If, as shown in FIG. 18, a two-dimensional array of receiving elements is divided into four parts and four 2×2 couplers are used to combine the signal from the four sub-arrays, the tilt or nonuniformity of the phase front (or amplitude nonuniformity) will direct a portion of the optical power to the higher order excitation modes of the system. If this array is illuminated by a vertically incident uniform plane wave, at each of the 2×2 couplers the light is directed such that Detector A receives all the power. Any asymmetric modes (in x or y directions or both) will be collected in the other detectors (as shown on the right with the symmetric properties of each of the four detectors.)

If even more modes are required (if the speckle pattern is extremely dense on the receiving 2D aperture), even higher levels of multimode detail can be achieved by adding additional 2×2 couplers similar to what was performed for the tree based one dimensional arrays.

In summary, by adding on chip photodetectors to the end of the trees one can correct any phase deviations occurring in the arrays and by adding additional four port splitters and detectors to the branches of the array the effects of the speckle on the receiving array can be alleviated.

At this point, while we have presented this disclosure using some specific examples, those skilled in the art will recognize that our teachings are not so limited. Accordingly, this disclosure should be only limited by the scope of the claims attached hereto.

The invention claimed is:

1. An optical phased-array device comprising:
an array of phase-controlled elements;
a binary-tree optical distribution network configured such that each individual phase-controlled element of the array is located at a leaf in the binary-tree optical distribution network;
a M×N coupler positioned at a node of the binary-tree optical distribution network, where M and N are both >1; and
two or more optical detectors, each individually coupled to one of two outputs of the M×N coupler;
wherein the two or more optical detectors are configured to detect backscattered light received by the phase-controlled elements.

2. The optical phased-array device of claim 1 further comprising:
a processor operationally connected to the two or more optical detectors.

3. The optical phased-array device of claim 1 further comprising a local oscillator, wherein said two or more optical detectors are included in a coherent detection arrangement including a splitter, and wherein the local oscillator is operationally connected to the two or more optical detectors via the splitter.

4. The optical phased-array device of claim 1 further comprising a local oscillator, wherein said two or more optical detectors include at least four optical detectors in an in-phase/quadrature (I/Q) detection arrangement including at least one 90 degree hybrid component that provides in-phase and quadrature outputs that have a relative 90 degree phase shift with respect to each other, and wherein the local oscillator is operationally connected to the at least four optical detectors via the 90 degree hybrid component.

5. The optical phased-array device of claim 1 further comprising
one or more additional M×N couplers positioned in the binary-tree optical distribution network, where M and N are both >1 for each of the one or more additional M×N couplers; and
one or more additional optical detectors each additional optical detector operationally connected to a single port of a single one of the additional M×N couplers.

6. The optical phased-array device of claim 5 further comprising a local oscillator, wherein said two or more optical detectors are included in a coherent detection arrangement including a splitter, and wherein the local oscillator operationally connected to the two or more optical detectors via the splitter.

7. The optical phased-array device of claim 5 further comprising a local oscillator, wherein said two or more optical detectors include at least four optical detectors in an in-phase/quadrature (I/Q) detection arrangement including at least one 90 degree hybrid component that provides in-phase and quadrature outputs that have a relative 90 degree phase shift with respect to each other, and wherein the local oscillator is operationally connected to the at least four optical detectors via the 90 degree hybrid component.

8. The optical phased-array device of claim 5 further comprising a processor operationally connected to all the optical detectors in the optical phased-array device.

9. The optical phased-array device of claim 1 configured such that the fundamental mode of backscattered light is directed to a certain one of the optical detectors and one or more higher order modes of backscattered light are directed to the other of the optical detectors.

10. The optical phased-array device of claim 1 further comprising two additional M×N couplers positioned at a second level of the binary-tree optical distribution network, where M and N are both >1 for each of the two additional M×N couplers, and two additional optical detectors, each optical detector individually coupled to an output of a respective one of the two additional M×N couplers.

11. The optical phased-array device of claim 8 further comprising a local oscillator operatively coupled to all of the optical detectors.

12. The optical phased-array device of claim 10 further comprising a local oscillator, wherein said two or more optical detectors are included in a coherent detection arrangement including a splitter, and wherein the local oscillator is operationally connected to the two or more optical detectors via the splitter.

13. The optical phased-array device of claim 10 further comprising a local oscillator, wherein said two or more optical detectors include at least four optical detectors in an in-phase/quadrature (I/Q) detection arrangement including at least one 90 degree hybrid component that provides in-phase and quadrature outputs that have a relative 90 degree phase shift with respect to each other, and wherein the local oscillator is operationally connected to the at least four optical detectors via the 90 degree hybrid component.

14. The optical phased-array device of claim 10 configured such that only higher order modes of backscattered light are directed to the additional optical detectors.

15. The optical phased-array device of claim 1 wherein the node at which the M×N coupler is positioned is a root of the binary-tree optical distribution network.

16. The optical phased-array device of claim 15 wherein M=2 and N=2 for the M×N coupler.

17. An optical phased-array device comprising:
a first array of phase-controlled elements;
a first binary-tree optical distribution network configured such that each individual phase-controlled element of the first array is located at a leaf in the first binary-tree optical distribution network;
a first M×N coupler positioned at a root of the first binary-tree optical distribution network, where M and N are both >1 for the first M×N coupler;
a first pair of two optical detectors, each optical detector individually coupled to one of two outputs of the first M×N coupler;
a second array of phase-controlled elements;
a second binary-tree optical distribution network configured such that each individual phase-controlled element of the second array is located at a leaf in the second binary-tree optical distribution network;
a second M×N coupler positioned at a root of the second binary-tree optical distribution network, where M and N are both >1 for the second M×N coupler;
a second pair of two optical detectors, each optical detector individually coupled to one of two outputs of the second M×N coupler; and
a local oscillator operatively connected to each individual optical detector of the first and second pairs of optical detectors;
wherein the optical detectors are configured to detect backscattered light received by the phase-controlled elements.

18. The optical phased-array device of claim 17 wherein an individual optical detector of the first pair of optical detectors detects one or more odd modes of the backscattered light and an individual optical detector of the second pair of optical detectors detects one or more odd modes of the backscattered light.

19. The optical phased-array device of claim 18 wherein an individual optical detector of the first pair of optical detectors detects one or more even modes of the backscattered light and an individual optical detector of the second pair of optical detectors detects one or more even modes of the backscattered light.

* * * * *